(12) United States Patent
Wang et al.

(10) Patent No.: US 10,883,652 B2
(45) Date of Patent: Jan. 5, 2021

(54) DISPLAY SYSTEM AND DISPLAY DEVICE BASE

(71) Applicants: Hefei BOE Optoelectronics Technology Co., Ltd., Hefei (CN); BOE TECHNOLOGY GROUP CO., LTD., Beijing (CN)

(72) Inventors: Sheng Wang, Beijing (CN); Jie Cao, Beijing (CN); Chengbing Zhu, Beijing (CN); Ming Fang, Beijing (CN); Shuai He, Beijing (CN)

(73) Assignees: Hefei BOE Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 24 days.

(21) Appl. No.: 16/423,430

(22) Filed: May 28, 2019

(65) Prior Publication Data
US 2020/0011478 A1 Jan. 9, 2020

(30) Foreign Application Priority Data
Jul. 6, 2018 (CN) .................... 2018 2 1068147 U (51) Int. Cl.
| | |
|---|---|
| *F16M 11/20* | (2006.01) |
| *H05K 5/00* | (2006.01) |
| *G01B 17/00* | (2006.01) |
| *F16M 11/22* | (2006.01) |
| *H04N 5/655* | (2006.01) |

(52) U.S. Cl.
CPC ..... *F16M 11/2085* (2013.01); *F16M 11/2014* (2013.01); *F16M 11/2092* (2013.01); *F16M 11/22* (2013.01); *G01B 17/00* (2013.01); *H04N 5/655* (2013.01); *H05K 5/0017* (2013.01); *F16M 2200/08* (2013.01)

(58) Field of Classification Search
None
See application file for complete search history.

(56) References Cited

U.S. PATENT DOCUMENTS

| | | | | |
|---|---|---|---|---|
| 7,626,569 | B2* | 12/2009 | Lanier ................... | G06F 1/1601 |
| | | | | 345/156 |
| 2006/0082518 | A1* | 4/2006 | Ram ..................... | G06F 1/1601 |
| | | | | 345/1.1 |
| 2006/0119572 | A1* | 6/2006 | Lanier ................... | G06F 1/1601 |
| | | | | 345/156 |
| 2006/0220505 | A1* | 10/2006 | Nakamura ................ | G06F 1/16 |
| | | | | 312/223.2 |

(Continued)

*Primary Examiner* — Jinhee J Lee
*Assistant Examiner* — Christopher L Augustin
(74) *Attorney, Agent, or Firm* — Thomas | Horstemeyer, LLP (57) ABSTRACT

The present disclosure provides a display system and a display device base for mounting a display device. The display device base includes a first horizontal displacement mechanism capable of being displaced along a first horizontal direction; a second horizontal displacement mechanism mounted on the first horizontal displacement mechanism and capable of being displaced along a second horizontal direction perpendicular to the first horizontal direction; and a rotation mechanism rotatably mounted on the second horizontal displacement mechanism and configured to mount the display device.

13 Claims, 3 Drawing Sheets

(56) References Cited

U.S. PATENT DOCUMENTS

| | | | |
|---|---|---|---|
| 2007/0194184 A1* | 8/2007 | Jang | F16M 11/08 |
| | | | 248/131 |
| 2008/0225472 A1* | 9/2008 | Chih | G06F 1/1601 |
| | | | 700/258 |
| 2010/0185326 A1* | 7/2010 | Choi | G06F 1/1601 |
| | | | 700/258 |
| 2012/0033960 A1* | 2/2012 | Hashimoto | F16M 11/046 |
| | | | 396/428 |
| 2017/0100632 A1* | 4/2017 | Castelo Branco | |
| | | | A41D 19/0027 |
| 2017/0293272 A1* | 10/2017 | Jeong | G06F 3/0412 |

* cited by examiner

DISPLAY SYSTEM AND DISPLAY DEVICE BASE

CROSS REFERENCE TO RELATED APPLICATION

This application is based upon, and claims the benefit of and priority to, Chinese Patent Application No. 201821068147.4, filed on Jul. 6, 2018, where the entire contents thereof are incorporated herein by reference.

TECHNICAL FIELD

The present disclosure relates to the field of intelligent display technologies based on the Internet of Things (IoT) technology and, in particular, to a display system and a display device base.

BACKGROUND

Presently, display devices such as liquid crystal televisions are generally fixedly mounted by means of suspension. This fixing method is simple and convenient, however, the user must be in a certain range in front of the television in order to watch the television clearly and conveniently. For example, the normal viewing distance of a normal 55-inch liquid-crystal display television (LCD TV) is three times a dimension of a TV. When the user's viewing angle is 20 degrees, the distance is 2.5 times the dimension of the TV. When the viewing angle is 30 degrees, the distance is 1.6 times the dimension of the TV. In addition, according to research in related disciplines in the art, the ideal viewing angle of a 55-inch LCD TV is in a range of 90 degrees. Once the wall is fixed, there are certain defects on the ideal viewing distance and the range of viewing angle, i.e., there will be a certain dead zone when watching TV in an indoor environment, for example.

SUMMARY

According to an aspect of the present disclosure, a display device base is provided. The display device base includes a first horizontal displacement mechanism capable of being displaced along a first horizontal direction; a second horizontal displacement mechanism mounted on the first horizontal displacement mechanism and capable of being displaced along a second horizontal direction perpendicular to the first horizontal direction; and a rotation mechanism rotatably mounted on the second horizontal displacement mechanism, and configured to mount the display device.

According to one of the embodiments of the present disclosure, the first horizontal displacement mechanism includes a first guiding rail extending along the first horizontal direction; a first sliding block slidably disposed at the first guiding rail; and a first driving mechanism configured to drive the first sliding block to slide along the first guiding rail.

According to one of the embodiments of the present disclosure, the first guiding rail includes a first substrate and a plurality of first rails fixed to the first substrate in parallel with each other, the plurality of first rails extending along the first horizontal direction, where a plurality of first sliding blocks are slidably fitted to the plurality of first rails, respectively.

According to one of the embodiments of the present disclosure, the first driving mechanism includes a first lead screw and a first motor, where the first lead screw has one end driven-connected to an output end of the first motor, and the other end is fitted to the first sliding block.

According to one of the embodiments of the present disclosure, where the second horizontal displacement mechanism includes a second guiding rail extending along the second horizontal direction perpendicular to the first horizontal direction and fixed on the first sliding block; a second sliding block slidably disposed at the second guiding rail; and a second driving mechanism configured to drive the second sliding block to slide along the second guiding rail.

According to one of the embodiments of the present disclosure, the second guiding rail includes a second substrate and a plurality of second rails fixed to the second substrate in parallel with each other, the plurality of second rails extending along the second horizontal direction, where a plurality of second sliding blocks are slidably fitted to the plurality of second rails, respectively.

According to one of the embodiments of the present disclosure, the second driving mechanism includes a second lead screw and a second motor, where the second lead screw has one end driven-connected to an output end of the second motor, and the other end is fitted to the second sliding block.

According to one of the embodiments of the present disclosure, the second horizontal displacement mechanism includes a bracket fixed on the plurality of second sliding blocks; a rotating shaft vertically disposed and rotatably connected to the bracket, and a third driving mechanism configured to drive the rotating shaft to rotate along a central axis of the rotating shaft.

According to one of the embodiments of the present disclosure, the third driving mechanism includes a third motor mounted to the bracket and driven-connected to the rotating shaft.

According to an aspect of the present disclosure, a display system includes a display device base, a display device, and a controller. The display device base includes a first horizontal displacement mechanism capable of being displaced along a first horizontal direction; a second horizontal displacement mechanism mounted on the first horizontal displacement mechanism and capable of being displaced along a second horizontal direction perpendicular to the first horizontal direction; and a rotation mechanism rotatably mounted on the second horizontal displacement mechanism. The display device mounted on the rotation mechanism includes a sensor configured to collect location information of a user relative to the display device. The controller is configured to control actions of the first horizontal displacement mechanism, the second horizontal displacement mechanism, and the rotation mechanism according to the location information, such that the display device moves in two horizontal directions perpendicular to each other and rotates to keep facing towards the user.

According to one of the embodiments of the present disclosure, the sensor is an ultrasonic scanning sensor.

According to one of the embodiments of the present disclosure, the display system further includes a wearable device for a user to wear, the wearable device being provided with a receiver configured to serve as a reference for the user so that the sensor collects location information of the user relative to the display device.

According to one of the embodiments of the present disclosure, the first horizontal displacement mechanism includes a first guiding rail extending along the first horizontal direction; a first sliding block slidably disposed at the first guiding rail; and a first driving mechanism configured to drive the first sliding block to slide along the first guiding rail.

According to one of the embodiments of the present disclosure, the first guiding rail includes a first substrate and a plurality of first rails fixed to the first substrate in parallel with each other, the plurality of first rails extending along the first horizontal direction, where a plurality of first sliding blocks are slidably fitted to the plurality of first rails, respectively.

According to one of the embodiments of the present disclosure, the second horizontal displacement mechanism includes a second guiding rail extending along the second horizontal direction perpendicular to the first horizontal direction and fixed on the first sliding block; a second sliding block slidably disposed at the second guiding rail; and a second driving mechanism configured to drive the second sliding block to slide along the second guiding rail.

According to one of the embodiments of the present disclosure, the second guiding rail includes a second substrate and a plurality of second rails fixed to the second substrate in parallel with each other, the plurality of second rails extending along the second horizontal direction, where a plurality of second sliding blocks are slidably fitted to the plurality of second rails, respectively.

According to one of the embodiments of the present disclosure, the second horizontal displacement mechanism includes a bracket fixed on the plurality of second sliding blocks, a rotating shaft vertically disposed and rotatably connected to the bracket, and a third driving mechanism configured to drive the rotating shaft to rotate along a central axis of the rotating shaft.

BRIEF DESCRIPTION OF THE DRAWINGS

The various objects, features, and advantages of the present disclosure will become more apparent from the detailed description of the preferred embodiments of the present disclosure with reference to the accompanying drawings. The drawings are only illustrative of the present disclosure and are not necessarily to scale. In the drawings, like reference numbers generally refer to the same or similar components. In the drawings.

DETAILED DESCRIPTION

Exemplary embodiments embodying the features and advantages of the present disclosure will be described in detail in the following description. It should be understood that the present disclosure is capable of various modifications in the various embodiments without departing from the scope of the present disclosure, and the description and drawings thereof are intended to illustrate only and not limit the present disclosure.

The following description of the various exemplary embodiments of the present disclosure refers to the drawings, which constitute part of the present disclosure and show different exemplary structures, systems, and steps implementing various aspects of the present disclosure by way of example. It should be understood that other specific aspects of components, structures, exemplary devices, systems, and steps can be used, and structural and functional modifications can be made without departing from the scope of the present disclosure. Moreover, although the terms "on", "between", "upper end," or the like may be used in this specification to describe various exemplary features and elements of the present disclosure, these terms are used herein only for convenience, for example, the direction according to the example shown in the drawings. Nothing in this specification should be construed as requiring a specific three dimensional orientation of the structure to fall within the scope of the disclosure.

A main objective of the present disclosure is to provide a display device base that expands the viewing range of the display device and reduces the viewing dead zone.

Figure 1:
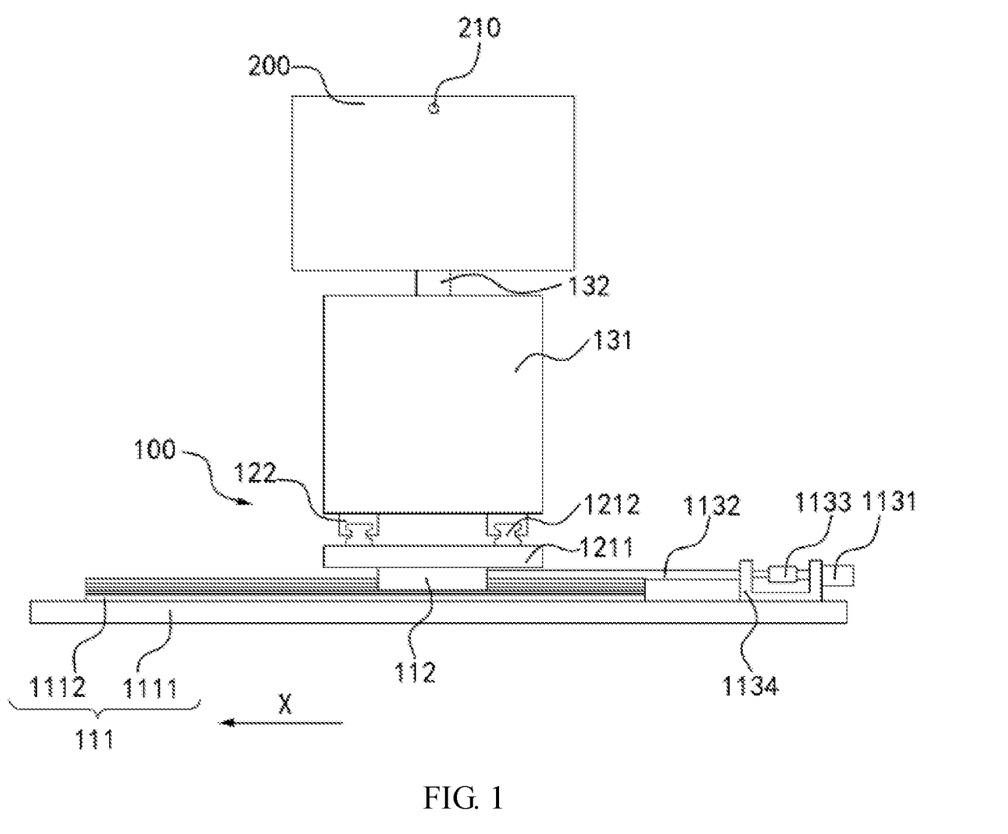
FIG. 1 is a side view of a display device base at an angle, according to an exemplary embodiment.

Referring to FIG. 1, FIG. 1 representatively shows a side view of a display device base at an angle proposed by the present disclosure. In the exemplary embodiment, the display device base proposed by the present disclosure is exemplified by a base applied to a liquid crystal television. It will be readily understood by those skilled in the art that various modifications, additions, substitutions, deletions, or other variations are made to the specific embodiments described below in order to apply the related designs of the present disclosure to other types of televisions or other display devices. These variations are still within the scope of the principles of the display device base proposed by the present disclosure.

As shown in FIG. 1, in the present embodiment, the display device base 100 proposed by the present disclosure is used for mounting and carrying a display device 200 such as a liquid crystal television, and may provide location adjustment function in which the display device 200 moves in two horizontal directions mutually forming an angle or rotates in the horizontal direction. The display device base 100 mainly includes a first horizontal displacement mechanism, a second horizontal displacement mechanism, and a rotation mechanism. The first horizontal displacement mechanism may displace along a first horizontal direction. The second horizontal displacement mechanism is mounted on the first horizontal displacement mechanism and may displace along a second horizontal direction perpendicular to the first horizontal direction. The rotation mechanism may be rotatably mounted on the second horizontal displacement mechanism. The display device is mounted on the rotation mechanism.

Figure 2:
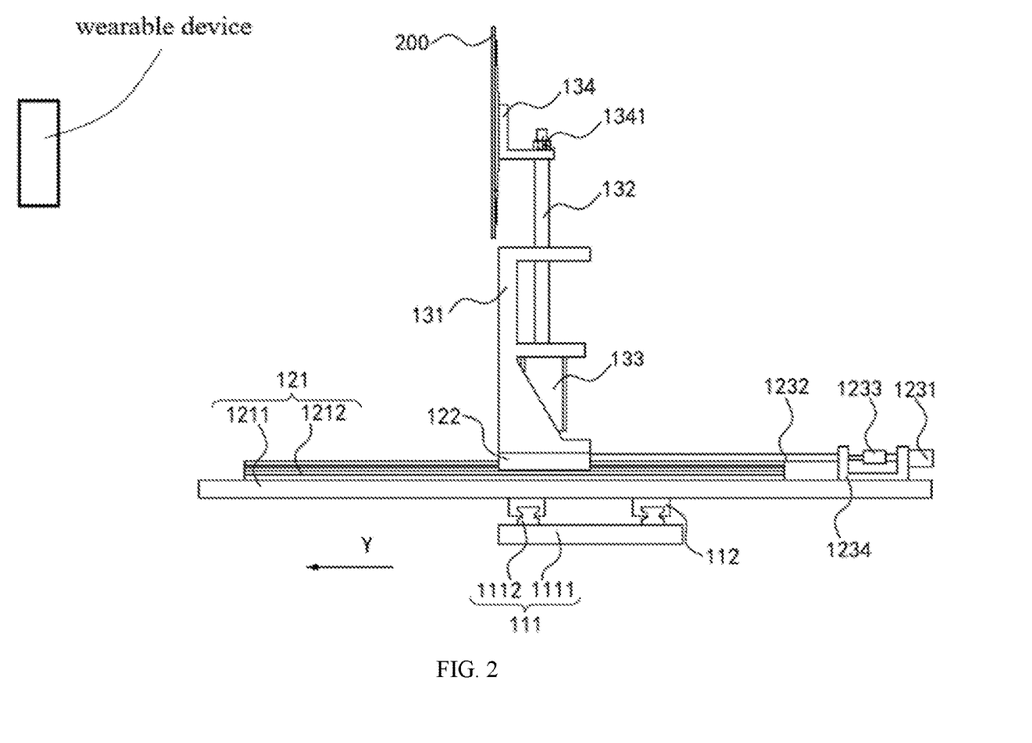
FIG. 2 is a side view of a display device base of FIG. 1 at another angle.

Referring to FIG. 2, FIG. 2 representatively shows a side view of the display device base that is capable of embodying the principles of the present disclosure at another angle. The structure, the connection mode, and the functional relationship of various main components of the display device base proposed by the present disclosure will be described in detail below with reference to the above drawings.

As shown in FIG. 1 and FIG. 2, in the present embodiment, the first horizontal displacement mechanism mainly includes a first guiding rail 111, a first sliding block 112, and a first driving mechanism. Specifically, the first guiding rail 111 extends along a first horizontal direction X. The first sliding block 112 is disposed on the first guiding rail 111 and is slidably fitted thereto. The first driving mechanism is used for driving the first sliding block 112 to slide along the first guiding rail 111.

As shown in FIG. 1 and FIG. 2, in the present embodiment, the second horizontal displacement mechanism mainly includes a second guiding rail 121, a second sliding block 122, and a second driving mechanism. Specifically, the second guiding rail 121 is fixed on the first sliding block 112 and extends along a second horizontal direction Y. There is an angle between the second horizontal direction Y and the first horizontal direction X, and the angle is 90° in this embodiment, i.e., the first horizontal direction X and the second horizontal direction Y are perpendicular to each other. The second sliding block 122 is disposed on the second guiding rail 121 and is slidably fitted thereto. The second driving mechanism is used for driving the second sliding block 122 to slide along the second guiding rail 121.

As shown in FIG. 1 and FIG. 2, in the present embodiment, the rotation mechanism mainly includes a bracket 131, a rotating shaft 132, and a third driving mechanism. Specifically, the bracket 131 is fixed on the second sliding block 122. The rotating shaft 132 is vertically disposed and may be rotated by itself. A lower end of the rotating shaft 132 is rotatably connected to the bracket 131, and an upper end of the rotating shaft 132 is used to mount the display device 200. The third driving mechanism is configured to drive the rotating shaft 132 to rotate, thereby driving the display device 200 to rotate.

Accordingly, in the present embodiment, the display device base 100 proposed by the present disclosure has a design of the structure of the first guiding rail 111, the first sliding block 112, the second guiding rail 121, the second sliding block 122, the bracket 131 and the rotating shaft 132, and the interaction relationship therebetween, so as to enable the translation of the display device 200 in two horizontal directions mutually forming an angle (for example, 90°) while enabling rotation of the display device 200 in the horizontal direction.

Further, as shown in FIG. 1 and FIG. 2, in the present embodiment, the first guiding rail 111 mainly includes a first substrate 1111 and two first rails 1112. Specifically, the first substrate 1111 is used to be placed on the ground or other carrying planes, and the two first rails 1112 are fixed on the first substrate 1111. The two first rails 1112 extend in parallel along the first horizontal direction X. Thus, the number of first sliding blocks 112 may also be two, and two first sliding blocks 112 respectively slidably fitted to the two first rails 1112, and the second guiding rails 121 are fixed on the two first sliding blocks 112. In other embodiments, the number of the first rails 1112 may also be one or plural, which plurality of first rails are parallel each other and spaced apart. Moreover, when the number of the first rails 1112 is plural, the number of the first sliding blocks 112 may also be plural while having the same number as that of the first rails 1112, or the first sliding block 112 may be a whole unit having a plurality of sliding chutes. The plurality of sliding chutes are respectively slidably fitted to the plurality of first rails 1112, which is not limited thereto.

Further, as shown in FIG. 1, in the present embodiment, the first driving mechanism mainly includes a first lead screw 1132 and a first motor 1131. Specifically, the first motor 1131 is relatively fixed to the first rail 111 and is located, for example, at one end of the first rail 111. One end of the first lead screw 1132 is driven-connected to an output end of the first motor 1131, and the other end thereof is fitted to the first sliding block 112. In other embodiments, other structures or devices such as a linear motor may be used instead of the above design as the first driving mechanism, which are not limited to the embodiment.

Further, in the present embodiment, based on the structural design of the first horizontal displacement mechanism having the first substrate 1111, the first motor 1131 may be fixedly mounted on the first substrate 1111 by, for example, the first mount 1134.

Further, in the present embodiment, the first motor 1131 may preferably be a small servo motor.

Further, in the present embodiment, the one end of the first lead screw 1132 is driven-connected to the output end of the first motor 1131 via the first coupler 1133, for example.

Further, as shown in FIG. 1 and FIG. 2, in the present embodiment, the second guiding rail 121 mainly includes a second substrate 1211 and two second rails 1212. Specifically, the second substrate 1211 is fixed on the first sliding block 112. The two second rails 1212 are fixed on the second substrate 1211, and the two second rails 1212 extend in parallel along the second horizontal direction Y. Thus, there may be two second sliding blocks 122, and two second sliding blocks 122 are respectively slidably fitted to the two second rails 1212. The bracket 131 is fixed on the two second sliding blocks 122. In other embodiments, the number of the second rails 1212 may also be one or plural, which plurality of second rails are parallel each other and spaced apart. Moreover, when the number of the second rails 1212 is plural, the number of the second sliding blocks 122 may be plural which has the same number as that of the second rails 1212, or the second sliding block may be a whole unit having a plurality of sliding chutes. The plurality of sliding chutes are respectively slidably fitted to the plurality of second rails 1212, which is not limited thereto.

Further, as shown in FIG. 2, in the present embodiment, the second driving mechanism mainly includes a second lead screw 1232 and a second motor 1231. Specifically, the second motor 1231 is relatively fixed to the second rail 121 and is located, for example, at one end of the second rail 121. One end of the second lead screw 1232 is driven-connected to an output end of the second motor 1231, and the other end thereof is fitted to the second sliding block 122. In other embodiments, other structures or devices, such as a linear motor, may be used instead of the above design as the second driving mechanism, which are not limited to the embodiment.

Further, in the present embodiment, based on the structural design of the second horizontal displacement mechanism having the second substrate 1211, the second motor 1231 may be fixedly mounted on the second substrate 1211 by, for example, the second mount 1234.

Further, in the present embodiment, the second motor 1231 may preferably be a small servo motor.

Further, in the present embodiment, the one end of the second lead screw 1232 is driven-connected to the output end of the second motor 1231 via the second coupler 1233, for example.

Further, as shown in FIG. 1 and FIG. 2, in the present embodiment, the bracket 131 may have, for example, an "E"-shaped structure. Specifically, the bracket 131 includes a vertical frame and three cross frames. The vertical frame is fixed on the second sliding block 122. The three cross frames are respectively horizontally fixed at the same side of the vertical frame, and are separated into two spaces. The third motor 133 is fixed into a relatively lower one of the two spaces, and the rotating shaft 132 passes through two relatively upper cross frames of the three cross frames and is driven-connected to the output end of the third motor 133. In other embodiments, the bracket 131 may use other structures, which is not limited to the embodiment.

Further, as shown in FIG. 2, in the present embodiment, the third driving mechanism mainly includes a third motor 133. Specifically, the third motor 133 is fixed into the bracket 131 and is driven-connected to the rotating shaft 132.

Further, as shown in FIG. 2, in the present embodiment, the third motor 133 may be disposed, for example, at a position below the lower end of the rotating shaft 132, i.e., the third motor 133 is driven-connected to the lower end of the rotating shaft 132.

Further, in the present embodiment, the third motor 133 may preferably be a small servo motor.

Further, as shown in FIG. 2, in the present embodiment, the upper end of the rotating shaft 132 may be fixedly connected to the display device 200, for example, via a fixed seat 134. Moreover, the fixed seat 134 and the rotating shaft 132 may be adjustably connected by the fastening bolt 1341.

It should be noted herein that the display device bases shown in the figures and described in this specification are merely a few examples of many types of display device bases that can employ the principles of the present disclosure. It should be clearly understood that the principle of the present disclosure is not limited to any detail of the display device base shown in the figures or described in the specification or any component of the display device base.

In summary, the display device base includes a first guiding rail, a first sliding block, a second guiding rail, a second sliding block, a bracket, and a rotating shaft. The first sliding block is slidably disposed on the first guiding rail. The second guiding rail is fixed on the first sliding block. The second sliding block is slidably disposed at the second guiding rail. The bracket is fixed on the second sliding block. The rotating shaft is vertically disposed and may be rotated by itself. A lower end of the rotating shaft is connected to the bracket, and an upper end thereof is used to mount the display device. According to the above structural design, the display device may move in two different horizontal directions or may rotate in a horizontal direction when mounted to the display device base, thereby improving the freedom of position and direction adjustment of the display device, and expanding the viewing range of the display device and reducing the viewing dead zone.

The present disclosure also provides a display system having the above-described display device base. Based on the above-described exemplary description of the display device base, an exemplary embodiment of the display system proposed by the present disclosure will be described below. In the present embodiment, the display system proposed by the present disclosure is exemplified by a liquid crystal television. It will be readily understood by those skilled in the art that various modifications, additions, substitutions, deletions, or other various forms may be made to the specific embodiments described below in order to apply the related designs of the present disclosure to other types of televisions or other display devices. These variations are still within the scope of the principles of the display system proposed by the present disclosure.

In the present embodiment, the display system proposed by the present disclosure mainly includes a display device such as a liquid crystal television, a display device base, and a controller.

Specifically, in the present embodiment, a side of a screen of the liquid crystal television is provided with a sensor 210 (which may be used with reference to FIG. 2 to observe the relative position of the sensor 210 and the display device 200), and the sensor 210 may be configured to collect location information of a user relative to the display device. The display device base is supported at the bottom of the liquid crystal television, and the display device base is configured to adjust the display device to move in two horizontal directions mutually forming an angle (for example, 90°) or to rotate in a horizontal direction by a driving mechanism. The controller is connected to the driving mechanism, and is configured to control the driving mechanism based on the location information collected by the sensor, such that the display device keeps facing toward the user.

Further, in the present embodiment, the display device base may use, for example, the structural design of the display device base proposed by the present disclosure and described in detail in the above embodiments. That is, the display device base includes a first guiding rail, a first sliding block, a second guiding rail, a second sliding block, a bracket, and a rotating shaft. The first guiding rail extends along the first horizontal direction. The first sliding block is slidably disposed at the first guiding rail and is driven by the first driving mechanism. The second guiding rail extends along a second horizontal direction perpendicular to the first horizontal direction and is fixed on the first sliding block. The second sliding block is slidably disposed at the second guiding rail and is driven by the second driving mechanism. The bracket is fixed on the second sliding block. The rotating shaft is vertically disposed and may be rotated by itself. A lower end of the rotating shaft is connected to the bracket, and an upper end is used to mount the liquid crystal television. The rotating shaft is driven by the third driving mechanism. In other embodiments, the display device base may also select other base structures that can implement the above-described adjustment functions for the liquid crystal television.

Further, in the present embodiment, the sensor 210 may preferably be an ultrasonic scanning sensor. In particular, an angle of rotation of the ultrasonic scanning sensor is preferably 120°, which is capable of converting ultrasonic signals into other energy signals (typically electrical signals). The ultrasonic wave refers to a mechanical wave with a vibration frequency higher than 20 KHz, which has the characteristics of high frequency, short wavelength, small diffraction phenomenon, especially good directivity, and capable of directionally propagating as rays. The ultrasonic wave has strong penetrating properties for liquids and solids, especially for opaque solids. When an ultrasonic wave hits an impurity or an interface, it will produce a significant reflection to reflect into an echo, which will generate a Doppler effect when it hits a moving object.

Figure 3:
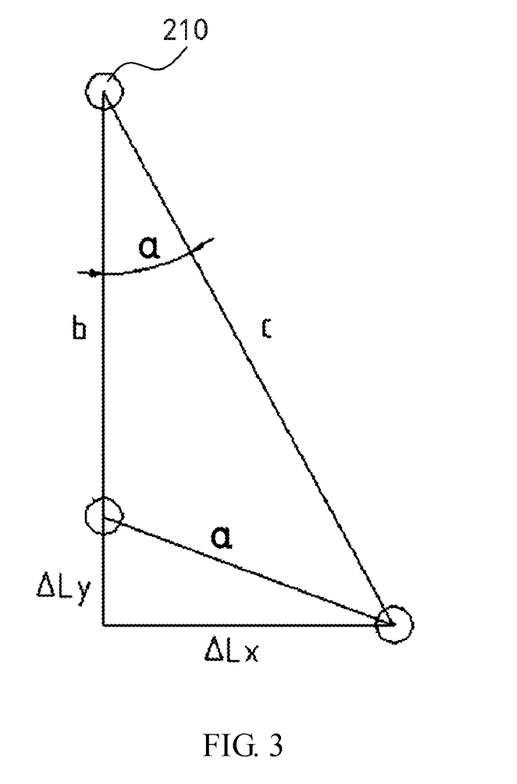
FIG. 3 is a schematic view of a user movement model of a display system according to an exemplary embodiment.

For ease of understanding, referring to FIG. 3, a schematic view of a user movement model of the display system proposed by the present disclosure is schematically shown. A is the position of the sensor 210, i.e., the position of the display device. B1 and B2 are different positions for the user to move, i.e., the user moves from B1 to B2. α is the movement angle of the user relative to the A position when moving from B1 to B2. a is the distance between B1 and B2, i.e., the moving distance of the user, b is the distance between A and B1, and c is the distance between A and B2. $\Delta L_x$ is the offset distance in the first horizontal direction X when the user moves from B1 to B2, and $\Delta L_y$ is the offset distance in the second horizontal direction Y when the user moves from B1 to B2. In addition, for convenience of description, the movement model shown in FIG. 4 is to use B1 as a certain position of the used when facing towards the liquid crystal television, i.e., the connection direction between B1 and A is the second horizontal direction Y.

As shown in FIG. 3, when the user is located at the B1 position, the ultrasonic scanning sensor emits ultrasonic wave, and a reflective wave is formed when the ultrasonic wave hits the user, and the ultrasonic scanning sensor records the time of a round trip of the ultrasonic wave, which is recorded as $t_1$, and the speed of the ultrasonic wave is known as V (V=340 m/s), where the distance b is $b=Vt_1/2$. When the user moves arbitrarily (for example, to the B2 position), the recorded time of the ultrasonic scanning sensor is $t_2$, and the distance c of the user from the position A is $c=Vt_2/2$.

According to the following equations:

$$\cos\text{ine theorem,}\cos\alpha=(b^2+c^2-a^2)/2bc \quad \text{①}$$

$$\cos\alpha=(b+\Delta L_y)/c \quad \text{②}$$

$$c^2=a^2+(c+\Delta L_y)^2 \quad \text{③}$$

The distance a, the offset angle α and the offset distance $\Delta L_y$ are unknown numbers. According to the equations ①②③, the offset angle α, and the offset distance $\Delta L_y$ of the second horizontal direction Y may be calculated, and the offset distance $\Delta L_x$ of the first horizontal direction X may also be calculated. Accordingly, the controller (or sensor) gives an adjustment signal to the display device base (e.g., each motor) to compensate the offset distances $\Delta L_x$, $\Delta L_y$, and the offset angle α of the user in the two horizontal directions, thereby enabling the user always at the best viewing distance and angle to realize the fully automatic intelligent adjustment of the LCD TV based on the principle of the Internet of Things (IoT). In addition, the above adjustment function may be turned on and off by the remote-control unit of the LCD TV.

Further, in the present embodiment, the display system may further include, for example, a wearable device for the user to wear. Specifically, a receiver is provided on the wearable device. The receiver is configured to receive ultrasonic waves emitted by the ultrasonic scanning sensor to serve as an interface for reflecting ultrasonic waves, i.e., as a reference for the user, when the ultrasonic scanning sensor collects location information of the user relative to the liquid crystal television. Accordingly, when there are a plurality of users in the scanning range of the ultrasonic scanning sensor (or other type of sensor), the user wearing the wearable device may be used as a reference for adjustment, so that the intelligent adjustment function of the display system is further applicable for multiple users watching at the same time.

It should be noted herein that the display systems shown in the figures and described in this specification are merely a few examples of many types of display systems that can employ the principles of the present disclosure. It should be clearly understood that the principle of the present disclosure is not limited to any detail of the display system shown in the figures or described in the specification or any steps of the display system.

In summary, in the display system proposed by the present disclosure, the display system includes a display device, a display device base, and a controller. The display device is provided with a sensor configured to collect location information of the user relative to the display device. The display device base is supported at the bottom of the display device, and the display device base is configured to adjust the display device to move in two horizontal directions perpendicular to each other or in a horizontal direction by a driving mechanism. The controller is connected to the driving mechanism, and the controller is configured to control the driving mechanism based on the location information, such that the display device keeps facing toward the user. According to this structural design, the display system can adjust the display device to face towards the user through the display device base according to the position of the user relative to the display device, thereby expanding the viewing range of the display device and reducing the viewing dead angle.

Exemplary embodiments of the display system and display device base proposed by the present disclosure are described and/or illustrated in detail above. However, embodiments of the present disclosure are not limited to the specific embodiments described herein, but rather, the components and/or steps of each embodiment can be used independently and separately from the other components and/or steps described herein. Each component and/or each step of an embodiment may also be used in combination with other components and/or steps of other embodiments. When introducing elements/components/etc. described and/or illustrated herein, the terms such as "a", "an", "the" and "said" are used to indicate the presence of one or more elements/components. The terms "comprise", "include", "have", "contain", and their variants are used to be open-type and are meant to include additional elements/components, etc., in addition to the listed elements/components/etc. In addition, the terms "first", "second", etc. are used only as example labels, rather than limitation for the number of objects.

While the display system and the display device base proposed by the present disclosure have been described in terms of various specific embodiments, those skilled in the art will recognize that the embodiments of the present disclosure can be modified within the spirit and scope of the claims.

What is claimed is:

1. A display device base for mounting a display device, wherein the display device base comprises:
   a first horizontal displacement mechanism capable of being displaced along a first horizontal direction;
   a second horizontal displacement mechanism mounted on the first horizontal displacement mechanism and capable of being displaced along a second horizontal direction perpendicular to the first horizontal direction; and
   a rotation mechanism rotatably mounted on the second horizontal displacement mechanism, the rotation mechanism being configured to mount the display device;
   wherein the first horizontal displacement mechanism comprises:
      a first guiding rail extending along the first horizontal direction;
      a first sliding block slidably disposed at the first guiding rail; and
      a first driving mechanism configured to drive the first sliding block to slide along the first guiding rail; and
   wherein the second horizontal displacement mechanism comprises:
      a second guiding rail extending along the second horizontal direction perpendicular to the first horizontal direction and directly fixed on the first sliding block;
      a second sliding block slidably disposed at the second guiding rail; and
      a second driving mechanism configured to drive the second sliding block to slide along the second guiding rail.

2. The display device base according to claim 1, wherein the first guiding rail comprises a first substrate and a plurality of first rails fixed to the first substrate in parallel with each other, the plurality of first rails extending along the first horizontal direction, wherein a plurality of first sliding blocks are slidably fitted to the plurality of first rails, respectively.

3. The display device base according to claim 1, wherein the first driving mechanism comprises a first lead screw and a first motor, wherein the first lead screw has one end driven-connected to an output end of the first motor, and the other end is fitted to the first sliding block.

4. The display device base according to claim 1, wherein the second guiding rail comprises a second substrate and a plurality of second rails fixed to the second substrate in parallel with each other, the plurality of second rails extending along the second horizontal direction, the second sliding block being one of a plurality of second sliding blocks slidably fitted to the plurality of second rails, respectively.

5. The display device base according to claim 1, wherein the second driving mechanism comprises a second lead screw and a second motor, wherein the second lead screw has one end driven-connected to an output end of the second motor, and the other end is fitted to the second sliding block.

6. The display device base according to claim 4, wherein the rotation mechanism comprises:
   a bracket fixed on the plurality of second sliding blocks;
   a rotating shaft vertically disposed and rotatably connected to the bracket; and
   a third driving mechanism configured to drive the rotating shaft to rotate along a central axis of the rotating shaft.

7. The display device base according to claim 6, wherein the third driving mechanism comprises a third motor mounted to the bracket and driven-connected to the rotating shaft.

8. A display system comprising:
   a display device base comprising:
      a first horizontal displacement mechanism capable of being displaced along a first horizontal direction;
      a second horizontal displacement mechanism mounted on the first horizontal displacement mechanism and capable of being displaced along a second horizontal direction perpendicular to the first horizontal direction; and
      a rotation mechanism rotatably mounted on the second horizontal displacement mechanism;
      wherein the first horizontal displacement mechanism comprises:
         a first guiding rail extending along the first horizontal direction;
         a first sliding block slidably disposed at the first guiding rail; and
         a first driving mechanism configured to drive the first sliding block to slide along the first guiding rail; and
      wherein the second horizontal displacement mechanism comprises:
         a second guiding rail extending along the second horizontal direction perpendicular to the first horizontal direction and directly fixed on the first sliding block;
         a second sliding block slidably disposed at the second guiding rail; and
         a second driving mechanism configured to drive the second sliding block to slide along the second guiding rail;
   a display device mounted on the rotation mechanism comprising a sensor configured to collect location information of a user relative to the display device; and
   a controller configured to control actions of the first horizontal displacement mechanism, the second horizontal displacement mechanism and the rotation mechanism according to the location information such that the display device moves in two horizontal directions perpendicular to each other and rotates to keep facing towards the user.

9. The display system according to claim 8, wherein the sensor is an ultrasonic scanning sensor.

10. The display system according to claim 8, wherein the display system further comprises a wearable device for the user to wear, the wearable device being provided with a receiver configured to serve as a reference for the user so that the sensor collects location information of the user relative to the display device.

11. The display system according to claim 8, wherein the first guiding rail comprises a first substrate and a plurality of first rails fixed to the first substrate in parallel with each other, the plurality of first rails extending along the first horizontal direction, wherein a plurality of first sliding blocks are slidably fitted to the plurality of first rails, respectively.

12. The display system according to claim 8, wherein the second guiding rail comprises a second substrate and a plurality of second rails fixed to the second substrate in parallel with each other, the plurality of second rails extending along the second horizontal direction, the second sliding block being one of a plurality of second sliding blocks slidably fitted to the plurality of second rails, respectively.

13. The display system according to claim 12, wherein the second horizontal displacement mechanism comprises:
   a bracket fixed on the plurality of second sliding blocks;
   a rotating shaft vertically disposed and rotatably connected to the bracket; and
   a third driving mechanism configured to drive the rotating shaft to rotate along a central axis of the rotating shaft.

\* \* \* \* \*